United States Patent [19]
Fujii et al.

[11] Patent Number: 5,343,011
[45] Date of Patent: Aug. 30, 1994

[54] RESISTANCE WELDING MONITOR

[75] Inventors: Koji Fujii, Osaka; Yasuhiro Goto, Hyogo; Makoto Ryudo, Sakai; Hideki Ihara, Takarazuka, all of Japan

[73] Assignee: Matsushita Electric Industrial Co., Ltd., Kadoma, Japan

[21] Appl. No.: 99,360

[22] Filed: Jul. 30, 1993

[30] Foreign Application Priority Data

Jul. 31, 1992 [JP] Japan .................. 4-204639
Sep. 24, 1992 [JP] Japan .................. 4-253329
Sep. 29, 1992 [JP] Japan .................. 4-258724
Dec. 1, 1992 [JP] Japan .................. 4-321615

[51] Int. Cl.$^5$ .............................................. B23K 11/25
[52] U.S. Cl. ............................................... 219/109
[58] Field of Search ................... 219/109, 110, 108

[56] References Cited

U.S. PATENT DOCUMENTS 4,302,653 11/1981 Denning et al. .
4,447,700 5/1984 Cohen .
5,081,338 1/1992 Dufrenne ....................... 219/109

FOREIGN PATENT DOCUMENTS 3320237 12/1983 Fed. Rep. of Germany .
59-14312 4/1984 Japan .
59-40550 10/1984 Japan .

OTHER PUBLICATIONS

"System Monitors and Controls Nugget Expansion in Real Time", Welding Journal, vol. 69 No. 2, Feb. 1990 pp. 61–63.

Patent Abstract of Japan, vol. 10 No. 258 (M508) (2294) Aug. 1986 re JP-A-61-71189.

European Patent Abstract, vol. 8 No. 100 (M295) May 1984, re JP-A 59013584.

Hiroaki Sato, Estimation of the Diameter of a Nugget Using a Numeral Calculation Model, 1988 (Japanese language document).

Yasuto Nishiu, A Study Relating to Acceleration in Quality Monitoring Operation of Numberal calculation Aided Type for the Resistance Spot Welding, 1991 (Japanese language document).

Akira Ishihara, A Study Relating to Simulation of Forming Process of Adhered Part in Spot Welding, 1983 (Japanese language document).

Primary Examiner—Clifford C. Shaw
Attorney, Agent, or Firm—Cushman, Darby & Cushman

[57] ABSTRACT

A welding voltage output from a power source of a resistance welder is derived on the basis of a welding current and an interelectrode voltage, and diameter of a nugget which is formed in a sheetlike work to be welded is estimated on the basis of the welding current, the welding voltage, data of material constant and a thickness of the sheetlike work, subsequently, the estimated diameter of nugget is composed with a target diameter of nugget, and thereby quality of the resistance welding is determined.

11 Claims, 9 Drawing Sheets

RESISTANCE WELDING MONITOR

FIELD OF THE INVENTION AND RELATED ART STATEMENT

1. FIELD OF THE INVENTION

The present invention relates generally to resistance welding, and more particularly to a monitor of a resistance spot welder.

2. DESCRIPTION OF THE RELATED ART

In welding operation of steel sheets for example by spot, welding which is a type of resistance welding, stable welding is realizable by maintaining welding conditions such as a shape of electrodes, a welding pressure between both the electrodes, a welding current and a weld time to respective predetermined values. Meanwhile, in the case that the spot welding is applied to galvanized sheet iron or high tensile strength steel sheets, it is known that stable welding can not be achieved only by maintaining the welding condition to the predetermined values. Recently, in order to maintain the stable welding and to fabricate welded products having high quality by the spot welding of the new material, a monitor for the resistance welding is disclosed in a variety of patents.

For example, according to the Japanese Patent Sho 59-14812, a time-scale variation of an interelectrode voltage (voltage across both electrodes) by which optimum welding has achieved with respect to a predetermined work condition such as a material of the work to be welded and the thickness thereof is predetermined as a reference voltage variation. In actual spot welding operation, the time-scale variation of the interelectrode voltage is measured and is compared with the reference voltage variation. When the variation of the measured interelectrode voltage is in coincidence with the reference voltage variation within a predetermined allowable range, it is determined that an adequate welding has been achieved. Moreover, the welding condition such as the welding current is controlled so that the interelectrode voltage matches the reference voltage variation.

In the above-mentioned prior art, it is important to detect an accurate interelectrode voltage. The interelectrode voltage is regarded to be measured by detecting an output voltage of two lead wires connected to both the electrodes, for example. However, large voltages are induced on the lead wires due to a magnetic field which is generated by a large current flowing through both the electrodes. Since the induced voltages are generated by magnetic couplings on the lead wires, the phase of the induced voltages are different from that of the voltage supplied from the power source of the spot welder. The induced voltages vary by magnetic coupling conditions of the lead wires, and produces an error in the measured value of the interelectrode voltage. Consequently, the change of the induced voltages results in occurrence of an error in determination of welded result and the control of the spot welding apparatus.

An example of a conventional monitor of the spot welder having means for eliminating the influence of the induced voltage is disclosed in the Japanese Patent Sho 59-40550. According to the prior art, the interelectrode voltage is detected at a time point at which a variation of the welding current becomes zero (time point at peak of an alternate current waveform) and escapes from the influence due to induction noise components. Consequently, the detected interelectrode voltage is represented by sampled values of the interelectrode voltage which are sampled at a frequency as twice high as that of the welding current. Since the sampled value is obtained only at the time point of the peak of the alternating current of the welding current, the interelectrode voltage can not be detected at an arbitrary time point. Therefore, the prior art is applicable only to the alternating current resistance welder, and can not be applied to a resistance welder having an inverter power source.

OBJECT AND SUMMARY OF THE INVENTION

An object of the present invention is to provide a monitor for resistance welding by which a welding current and an interelectrode voltage are detected, and a diameter of nugget which may be formed in a work to be welded is estimated on the basis of the detected welding current and interelectrode voltage. The result of welding is monitored by comparing the estimated diameter of the nugget with a predetermined reference diameter.

Another object of the present invention is to provide a detection device for detecting a true welding voltage which is applied across both electrodes from a power source of the spot welder.

The resistance welding monitor in accordance with the present invention comprises:

input means for inputting data representing material characteristics of a material of a work to be welded, data representing a thickness of the work and data representing the shape of a pair of electrodes of a resistance welder, a current sensor for detecting a welding current in welding operation, welding voltage detection means for detecting a welding voltage which is a true output voltage of a power source of the resistance welder, on the basis of the welding current and the interelectrode voltage, detected by interelectrode voltage measuring means for measuring an interelectrode voltage received through a pair of coupling wire from the pair of electrodes, calculation means for deriving a contact diameter which is a diameter of a current-pass between the electrode and work and an interplate current-pass diameter which is a diameter of a contact part of plural plates of the work, on the basis of an electrode resistance of the resistance of the electrode, a contact resistance of a resistance between the electrode and the surface of the work and a work resistance which is a ratio between the welding voltage and the welding current, means for deriving a temperature distribution in the work on the basis of the welding voltage, welding current, contact diameter and interplate current pass diameter, nugget diameter calculation means for deriving a nugget diameter which is formed between the plural plates on the basis of the temperature distribution, input means for inputting data of a reference nugget diameter of a target diameter, and comparison means for comparing the nugget diameter with the reference nugget diameter and for outputting a comparison result.

The welding voltage measuring apparatus of a resistance welder in accordance with the present invention comprises:
- a current sensor for detecting a welding current and for outputting a detected voltage,
- interelectrode voltage detection means for detecting an interelectrode voltage across a pair of electrodes of the resistance welder,
- first calculation means for deriving a ratio of the detected voltage to the interelectrode voltage at a point of time of the rise edge of the welding current,
- second calculation means for multiplying one of the detected voltage and the interelectrode voltage by the ratio derived by the first calculation means, and for equalizing both values of the detected voltage and the interelectrode voltage at the point of time of the rise edge, and
- third calculation means for deriving a voltage difference between the equalized detected voltage and interelectrode voltage.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Figure 1:
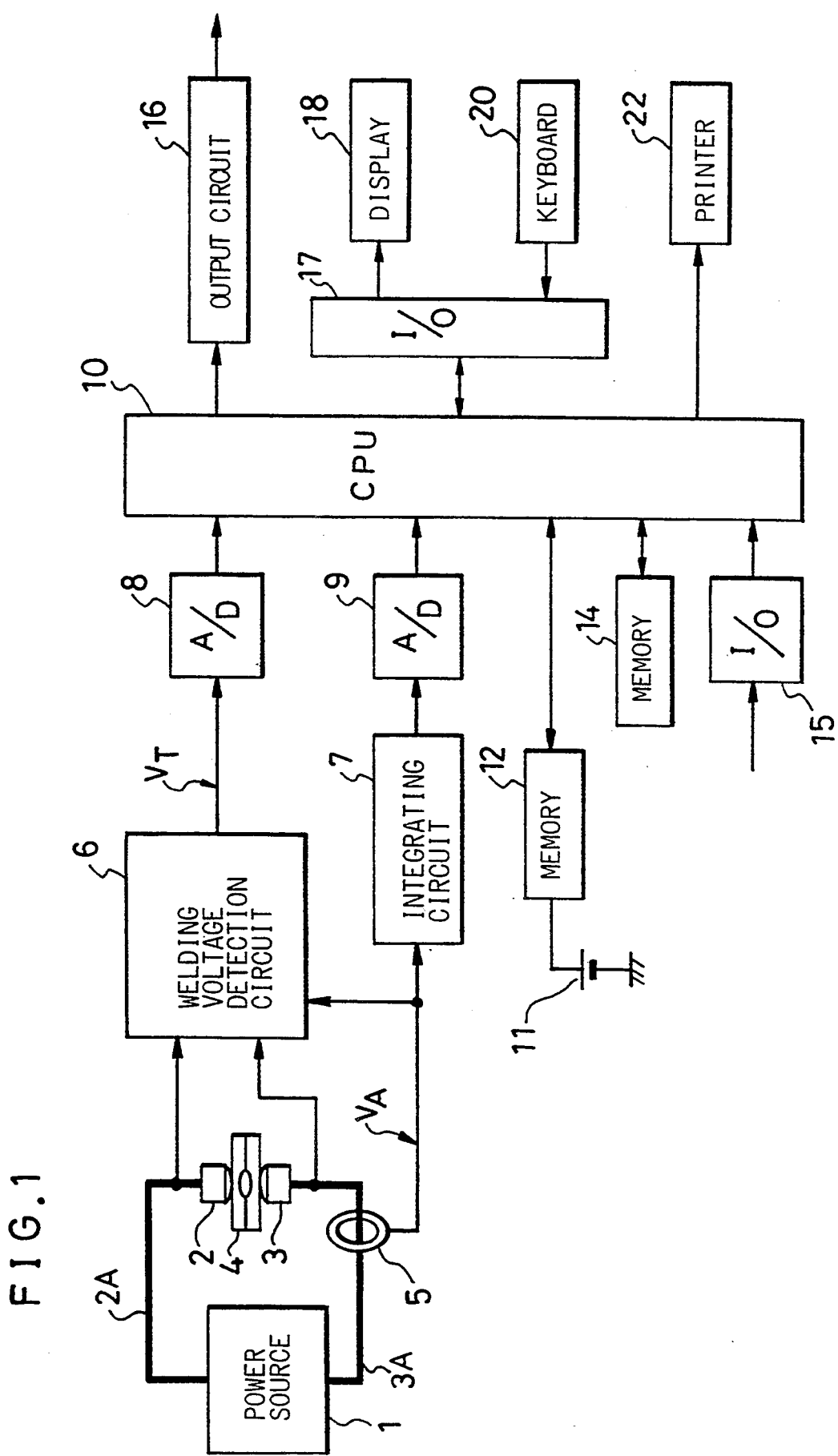
FIG. 1 is a block diagram of an embodiment of a monitor of resistance welding in accordance with the present invention.
Figure 4:
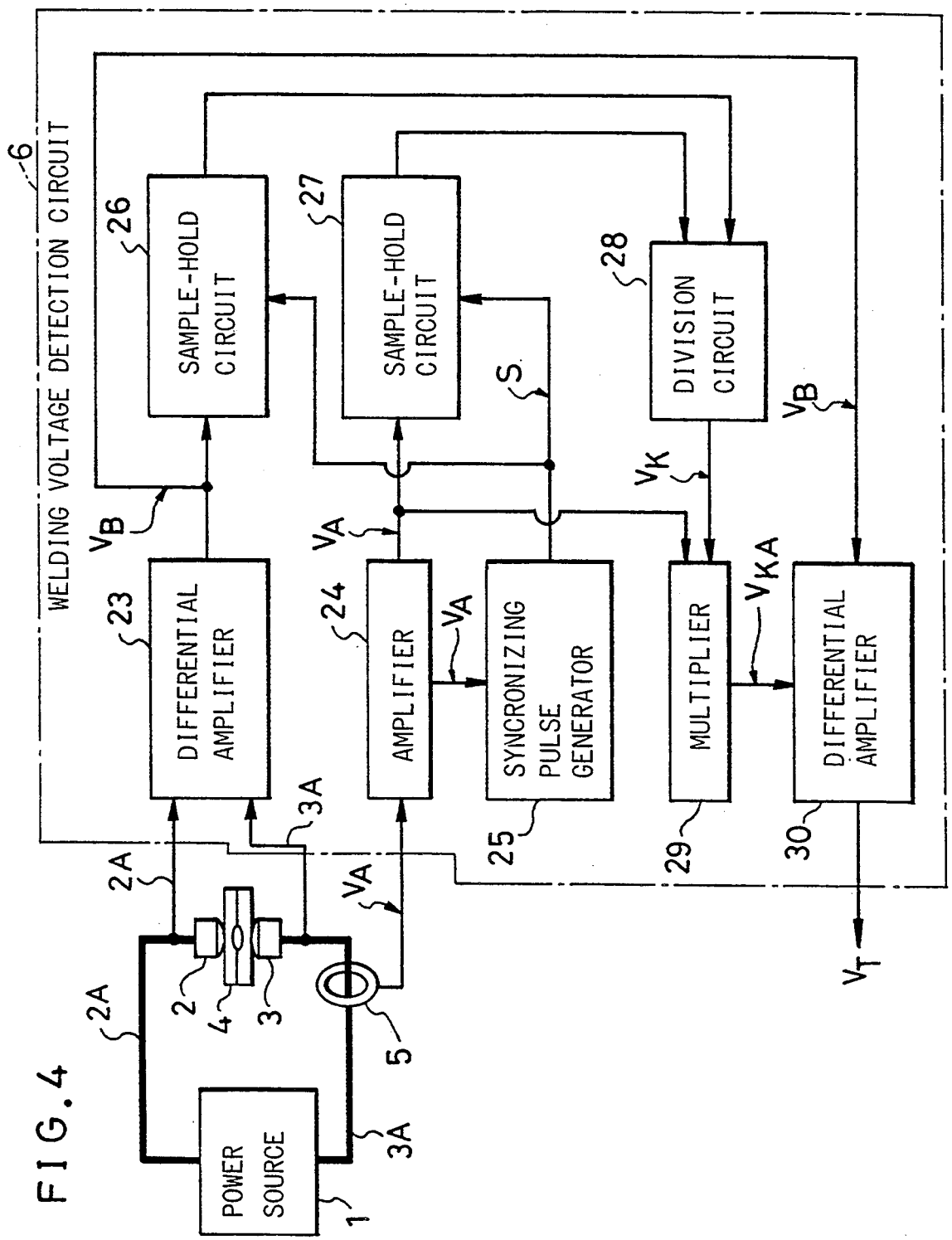
FIG. 4 is a block diagram of a first example of a welding voltage detection device which is used in the embodiment.
Figure 6:
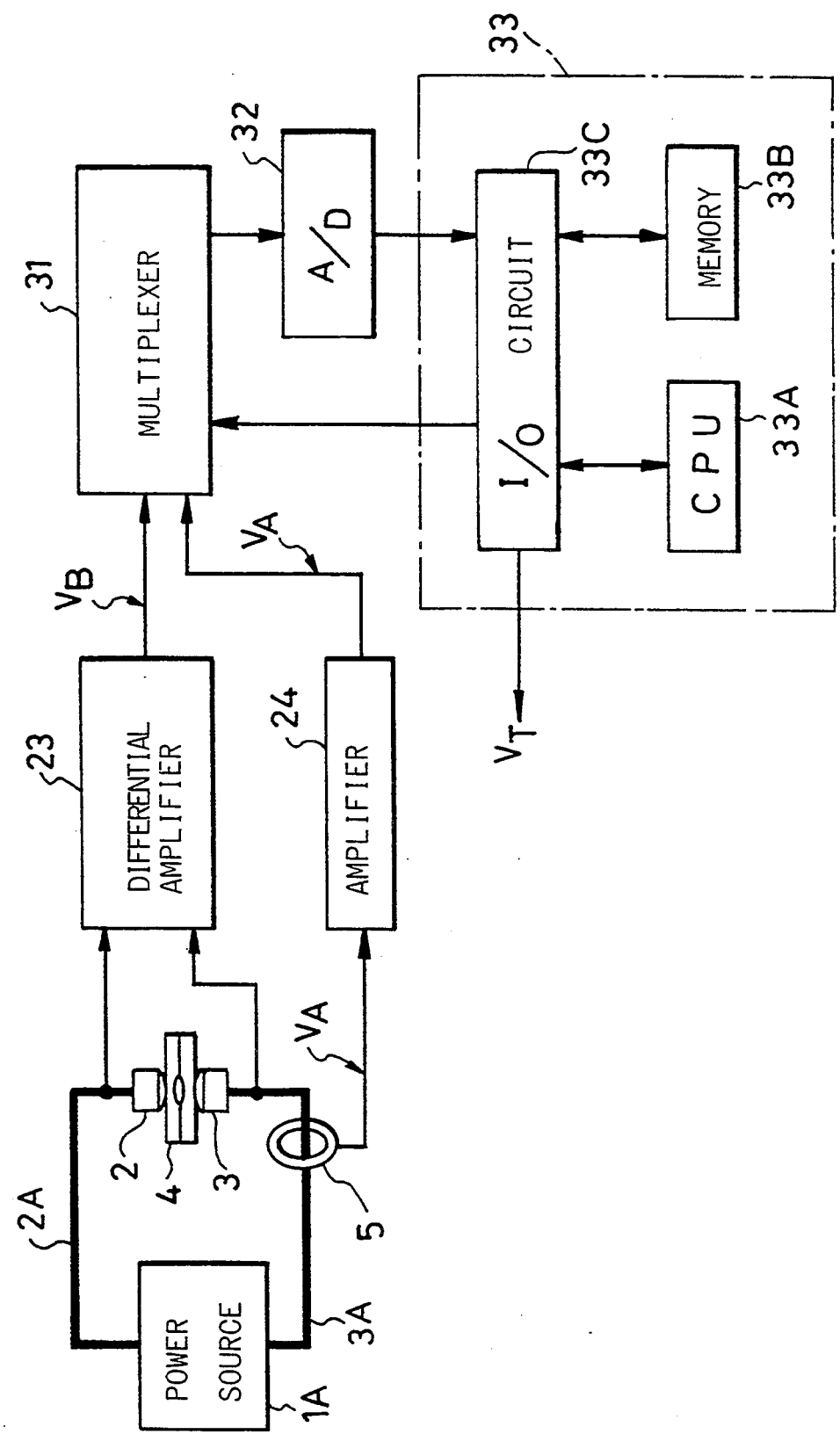
FIG. 6 is a block diagram of a second example of the welding voltage detection device which is used in the embodiment.

FIG. 1 is a block diagram of an embodiment of a monitor of resistance spot welding in accordance with the present invention. Referring to FIG. 1, a power source 1 of a resistance welder outputs an alternating current of the frequency of an electric utility during a time period which is predetermined by a built-in timer (the time period is represented by an integral number of period of the alternating current). The alternating current output from the power source 1 is applied across a pair of electrodes 2 and 3 which clamp a work 4 to be welded by known clamping mechanism (not shown) through respective electrical conductive members 2A and 3A. A "true voltage" which is applied across both the electrodes 2 and 3 from the power source 1 is designated as a "welding voltage $V_T$". The welding voltage $V_T$ during welding operation can not be measured by an ordinary volt meter, because when the alternating current flows through both the electrodes 2 and 3, magnet field is generated in the vicinity of electrical conducting members 2A and 3A connecting the electrodes 2 and 3 to the power source 1, respectively; and a voltage is induced on lead wires connecting between the electrodes 2, 3 and the volt meter. In the monitor of the resistance welding, it is required to detect the welding voltage $V_T$ for an input data to the monitor. In the embodiment of the present invention, the welding voltage $V_T$ is detected by a welding voltage detection circuit 6. Detailed configuration of the welding voltage detection circuit 6 is shown in FIGS. 4 and 6, and the operation is detailed hereinafter.

The welding voltage $V_T$ detected by the welding voltage detection circuit 6 is converted to a digital signal by an analog to digital converter 8 and is applied to a CPU 10. On the other hand, a welding current $I_W$ is detected by a current sensor 5 which is composed of a toroidal coil, and a "detected voltage $V_A$" is output from the current sensor 5. The detected voltage $V_A$ is a value of which the welding current $I_W$ is differentiated by a time t as given by $$V_A = K_A \cdot (dI_W/dt) \qquad (1),$$

where, $K_A$ is a constant which depends on configuration of the current sensor 5. Consequently, the phase of the detected voltage $V_A$ is shifted with respect to the phase of the welding current $I_W$ by 90°.

The detected voltage $V_A$ is inputted to an integrating circuit 7 and is integrated. Consequently, the phase of the detected voltage $V_A$ is substantially equalized with the phase of the welding current $I_W$. The detected voltage $V_A$ is applied to an analog to digital converter 9 and is converted to a digital signal which is applied to the CPU 10. A calculation system is composed of the CPU 10, memories 12 and 14, a display apparatus 18, a key board 20 and a printer 22. A control signal for the resistance spot welder based on the calculation in the calculation system is output to the output circuit 16.

In general, determination of welded state in the resistance spot welding (quality of welding) necessitates destructive test. According to the present invention, an estimated diameter of nugget which is formed in the work to be welded is obtainable on the basis of the welding voltage $V_T$ and the detected voltage $V_A$, and the estimated diameter of the nugget is compared with a predetermined reference value. Thereby the quality of welding is determined without the destructive test.

Method for estimating the diameter of a nugget is disclosed in thesis papers of the master course in the Osaka University Graduate School, for example. Several examples of the papers are listed hereafter.

"A study relating to simulation of a forming process of adhered part in spot welding" (by Mr. Akira Ishihara, 1983), "Estimation of the diameter of a nugget using a numeral calculation model" (by Mr. Hiroaki Sato, 1988), and "A study relating to acceleration in quality monitoring operation of numeral calculation aided type for the resistance spot welding" (by Mr. Yasuto Nishiu, 1991).

In the embodiment of the monitor of the resistance spot welding in accordance with the present invention, the estimation of the diameter of the nugget is obtainable on the basis of an estimation method of the diameter of the nugget which is disclosed by Mr. Yasuto Nishiu. The outline of the estimation method is elucidated referring to FIGS. 2(a) and 2(b) hereafter.

Properties in dependence on material of a work to be welded and a thickness H of the work influence a welding condition in the resistance spot welding. Accordingly, "material constant data m" and "sheet thickness data h" are set on the basis of the material constants such as a specific heat and a melting point representing property of the work. Moreover, "electrode profile data Pr" is set on the basis of the profile of electrode tips which contact the surface of the work. The electrode profile data Pr includes data of the radius of curvature of the electrode tip, for example.

Figure 2:
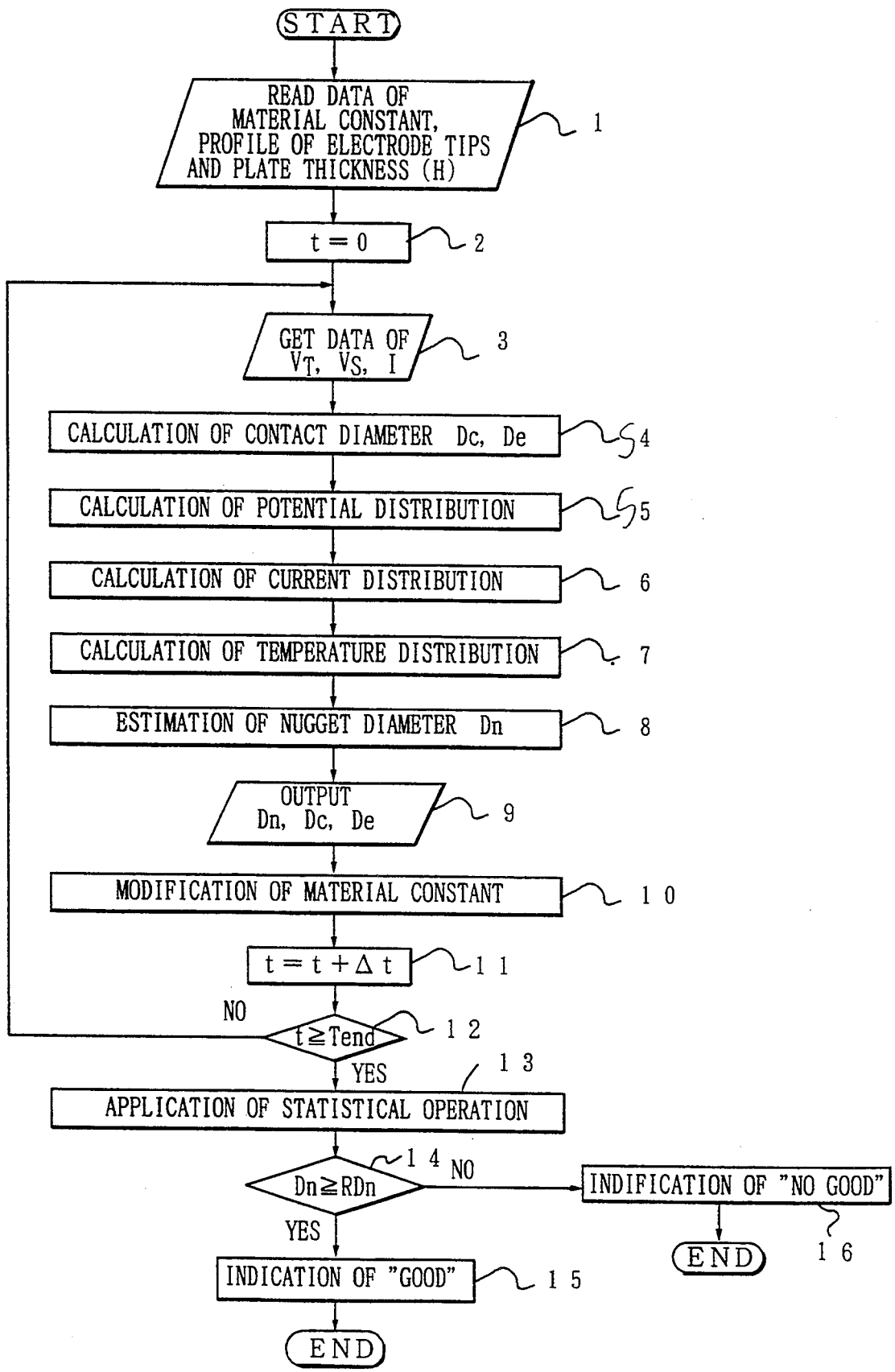
FIGS. 2(a) and 2(b) are flow charts for deriving a diameter of nugget in the embodiment.
Figure 2:
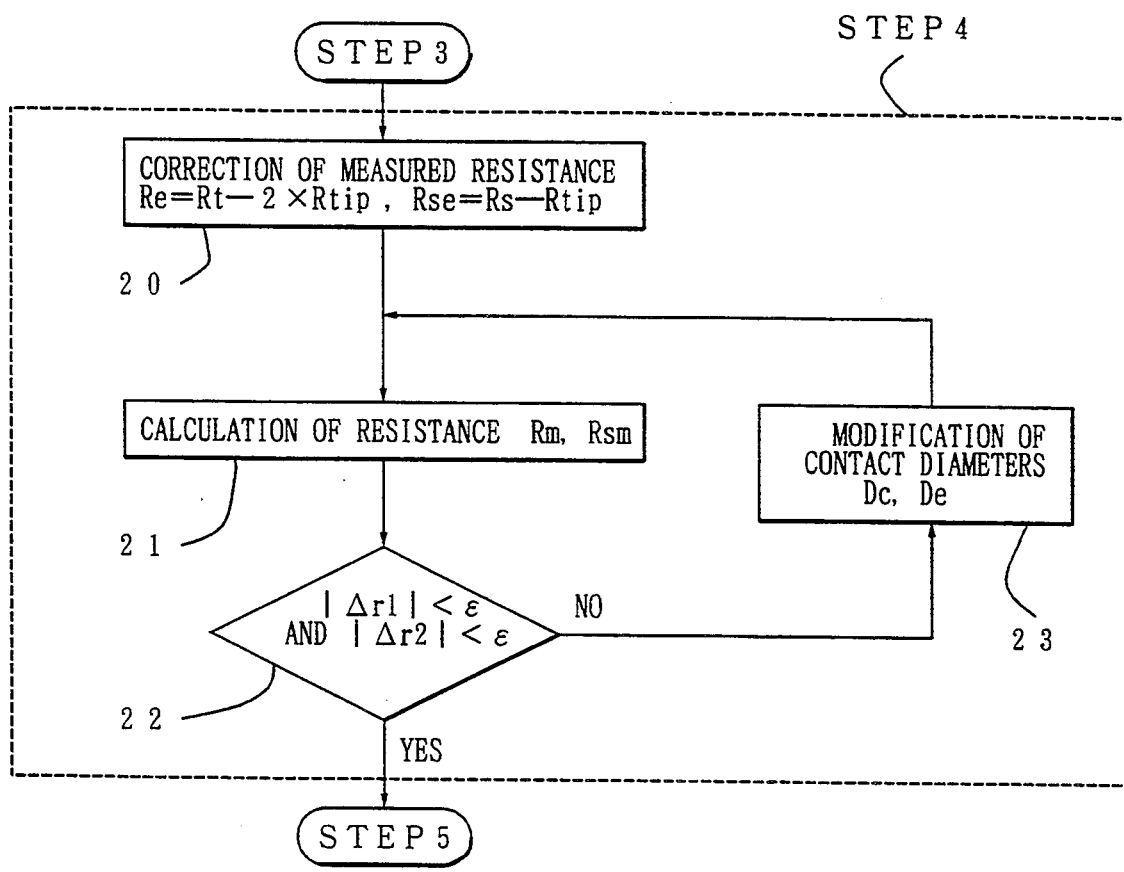
Figure 3:
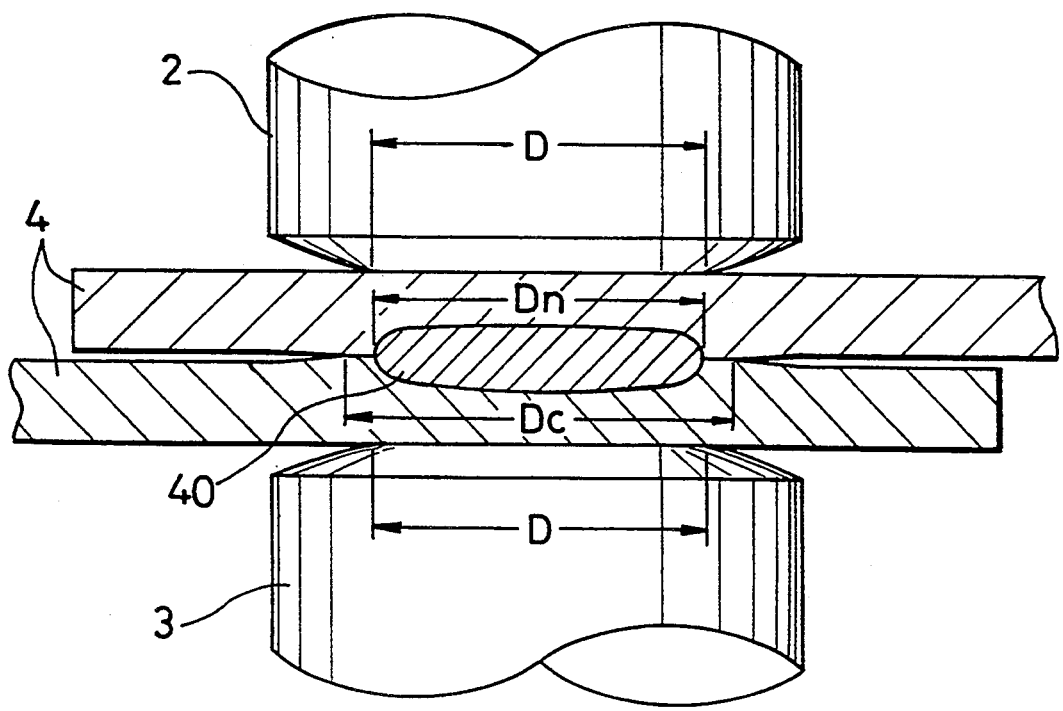
FIG. 3 is a side view of a relevant part of a resistance spot welder.

FIG. 2(a) is a flow chart of operation of the embodiment. First, the above-mentioned material constant data m, the sheet thickness data h and the electrode profile data Pr are read into the CPU 10 at Step 1. These data are inputted by the key board 20 shown in FIG. 1 and is stored in the memory 12 in advance. Subsequently, a time data is set to zero at Step 2. "Welding voltage data $V_t$" representing the welding voltage $V_T$, "voltage data $V_s$" representing a voltage between the surface of the work and the electrode tip and "welding current data I" representing the welding current $I_W$ are inputted at Step 3. The welding voltage $V_T$ is obtained by the welding voltage detection circuit 6, and the welding current $I_W$ is detected by the current sensor 5. The voltage data $V_S$ is obtained by experimental operation. The electrodes of the resistance spot welder, for example as shown in FIG. 3, has a tip having contact face of a diameter D defined by chamfering the edge part of a cylindrical metal rod. The welding current $I_W$ flows in the work through a virtual area which is smaller in diameter than the diameter D, as known in the art. The diameter of the virtual area is designated as a "contact diameter De". Additionally, a diameter of the contact part between two sheets is designated as an "interplate current-pass diameter Dc". A diameter of the nugget which is formed between these two sheets by the spot welding is designated as a "nugget diameter Dn".

The contact diameter De and the interplate current-pass diameter Dc are calculated at Step 4 in the flow chart of FIG. 2(a). The Step 4 comprises Steps of the flow chart shown in FIG. 2(b). At Step 20 in FIG. 2(b), an "electrode resistance Rtip" of the resistance of the electrodes and a "contact resistance Rs" which is a resistance between the electrode and the surface of the work are inputted. Additionally, an "interelectrode resistance Rt" which is derived by a ratio ($V_T/I_W$) of the welding voltage $V_T$ to the welding current $I_W$ are inputted.

Subsequently, calculating operation given by equations (2) and (3) is performed by using the above-mentioned electrode resistance Rtip, the contact resistance Rs and the interelectrode resistance Rt. And a work resistance Re and a surface resistance Rse at the contact surface between the electrode and the work are derived as follows:

$$Re = Rt - 2 \times Rtip \qquad (2)$$

$$Rse = Rs - Rtip \qquad (3).$$

Subsequently, at Step 21, an estimated work resistance Rm, which is an estimated value of the work resistance Re, and an estimated surface resistance Rsm, which is an estimated value of the surface resistance Rse at the contact surface between the electrode and the work, are calculated. In the calculating operation at the Step 21, the electrodes and the work are divided into a virtual plurality of small grids, and the material constants of the material of the work are applied to every grids. The material constants at a room temperature (20° C., for example) are applied at a start of the calculating operation at Step 2 in the flow chart shown in FIG. 2(a). Then, after the start of the calculating operation, the calculating operation is performed by using material constants corresponding to the temperature of each grid which have been derived at Step 7 in the flow chart shown in FIG. 2(a). The contact diameter De and the interplate current-pass diameter Dc, which are obtained by experimental operation, are used as initial values.

The absolute value of a difference Δr1 between the work resistance Re and the estimated work resistance Rm and the absolute value of a difference Δr2 between the surface resistance Rse and the estimated surface resistance Rsm are derived at Step 22; and it is determined whether both absolute values are smaller than a predetermined error ε. If both absolute values are not smaller than the error ε, the flow advances to Step 23, and the constant diameter De and the interplate current-pass diameter Dc are changed. Moreover, the number of grid in the contact part of the electrode are changed, and calculation at Step 21 and Step 22 are repeated by modifying the values of the estimated work resistance Rm and the estimated surface resistance Rsm. If both absolute values are smaller than the error ε at Step 22, the flow advances to Step 5 in the flow chart shown by FIG. 2(a).

At Step 5, potential distribution in the work 4 is calculated on the basis of the contact diameter De and the interplate current-pass diameter Dc obtained at Step 4. The calculation of the potential distribution is performed by using a Laplace equation "$\nabla(k\nabla V)=0$" on the basis of the data of the contact diameter De, the interplate current-pass diameter Dc and a welding current of each grid. Subsequently, at Step 6, a current distribution in the work is calculated on the basis of a current flowing through each grid. At Step 7, a temperature distribution is obtained from the current distribution of the grid. The temperature at a grid is derived by solving a heat equation (4) by using the known control volume method.

$$C\sigma \frac{dT}{dt} = \nabla(K\nabla T) + \rho \delta^2, \qquad (4)$$

K: coefficient of thermal conductivity,
C: specific heat,
T: temperature,
σ: density of material,
ρ: specific resistance, and
δ: current density.

At Step 8, a nugget diameter Dn is derived on the basis of the temperature distribution in the work obtained at Step 7. The nugget 40 is formed in the work at a part at which the temperature exceeds the melting point of the material, therefore an area having the grids of the temperature exceeding the melting point is derived in the work. In the case that there is no grid in which the temperature exceeds the melting point, the nugget diameter Dm is zero. In general, since the temperature is highest in the center part of the work, the nugget 40 glows from the center of the work to the radial direction in correspondence to heat generation. At Step 9, the nugget diameter Dn, the interplate current-pass diameter Dc and the contact diameter De are output as output data.

At each Step mentioned above, the material constants of the work vary in compliance with increase of the temperature. Therefore, at Step 10, the values of the material constants are modified on the basis of the temperature distribution derived at Step 7. Subsequently, at Steps 11 and 12, the process from Step 3 to Step 10 is repeated every predetermined time Δt until a welding repetition time Tend. Consequently, the nugget diameter Dn is derived at the welding completion time Tend and is output. The output nugget diameter Dn represents an estimated nugget diameter.

Subsequently, at Step 13, statistical operation may be applied to a plurality of nugget diameters Dn derived by successive plural welding processes as described hereinafter. At Step 14, the estimated nugget diameter Dn is compared with the reference nugget diameter RDn (target diameter) stored in the memory 14 in advance. When the estimated nugget diameter Dn is equal or larger than the reference nugget diameter RDn, it is determined that the work has been adequately welded. The result is indicated at Step 15. When the estimated nugget diameter Dn is smaller than the reference nugget diameter RDn, the result is indicated at Step 16.

At Step 20 in FIG. 2(b), the contact resistance Rs and the surface resistance Rse, which is between the electrode and the work, are derived on the basis of the measured values of the welding voltage $V_T$, the voltage Vs between the work surface and the electrode and the welding current $I_W$, and hence the estimated work resistance Rm and the estimated surface resistance Rsm are derived thereby. Moreover, the interplate current-pass diameter Dc and the contact diameter De are derived on the basis of the estimated work resistance Rm and the estimated surface resistance Rsm. Alternatively, the calculation is simplified by using the below-mentioned relation (5) between the interplate current-pass diameter Dc and the contact diameter De.

$$\frac{Dc}{2h} = \frac{De}{2h} + K. \qquad (5)$$

h: thickness of work
K: 0.35–0.4

According to the above-mentioned method, the voltage Vs between the work surface and the electrode is not required to be measured.

In calculation of the estimated nugget diameter Dn, statistical operation may be applied to a plurality of values of the estimated nugget diameter Dn which are derived in successive plural welding operations as shown in Step 13 of FIG. 2(a). For example, an estimated nugget diameter Dn can be obtained by calculating an average value of a plurality of the estimated nugget diameters basing on the same nugget. Alternatively, a regression line is derived on the basis of a variation of the plurality of estimated nugget diameters, and the estimated nugget diameter Dn may be derived on the basis of the regression line. Moreover, the plurality of estimated nugget diameters of the same nugget are divided into plural groups in a time sequence, and an average value of the estimated nugget diameter is calculated in each group. Subsequently, a regression line is derived on the basis of the difference of these average values, and the estimated nugget diameter Dn is derived from the regression line.

EXAMPLE 1

FIG. 4 is a block diagram of a welding voltage detection circuit 6 which is used in the monitor of the resistance welding in accordance with the present invention. Referring to FIG. 4, a power source 1 of a resistance welder outputs an alternating current of the frequency of the electric utility, and the output voltage is designated as a "welding voltage $V_T$". The welding voltage $V_T$ is applied across the electrodes 2 and 3 through respective electrical conductive members 2A and 3A during a predetermined time period which is set by a built-in timer circuit. The electrodes 2 and 3 cramp a work 4 to be welded with a predetermined welding pressure which is applied by the known cramping mechanism (not shown). The waveform of the welding voltage $V_T$ is shown by a curve F4 in FIG. 5(e). A current sensor 5 is mounted on the electrical conductive member 3A connecting between the power source 1 and the electrode 3, and thereby a welding current $I_W$ flowing in the electrical conductive member 3A is detected.

Figure 5:
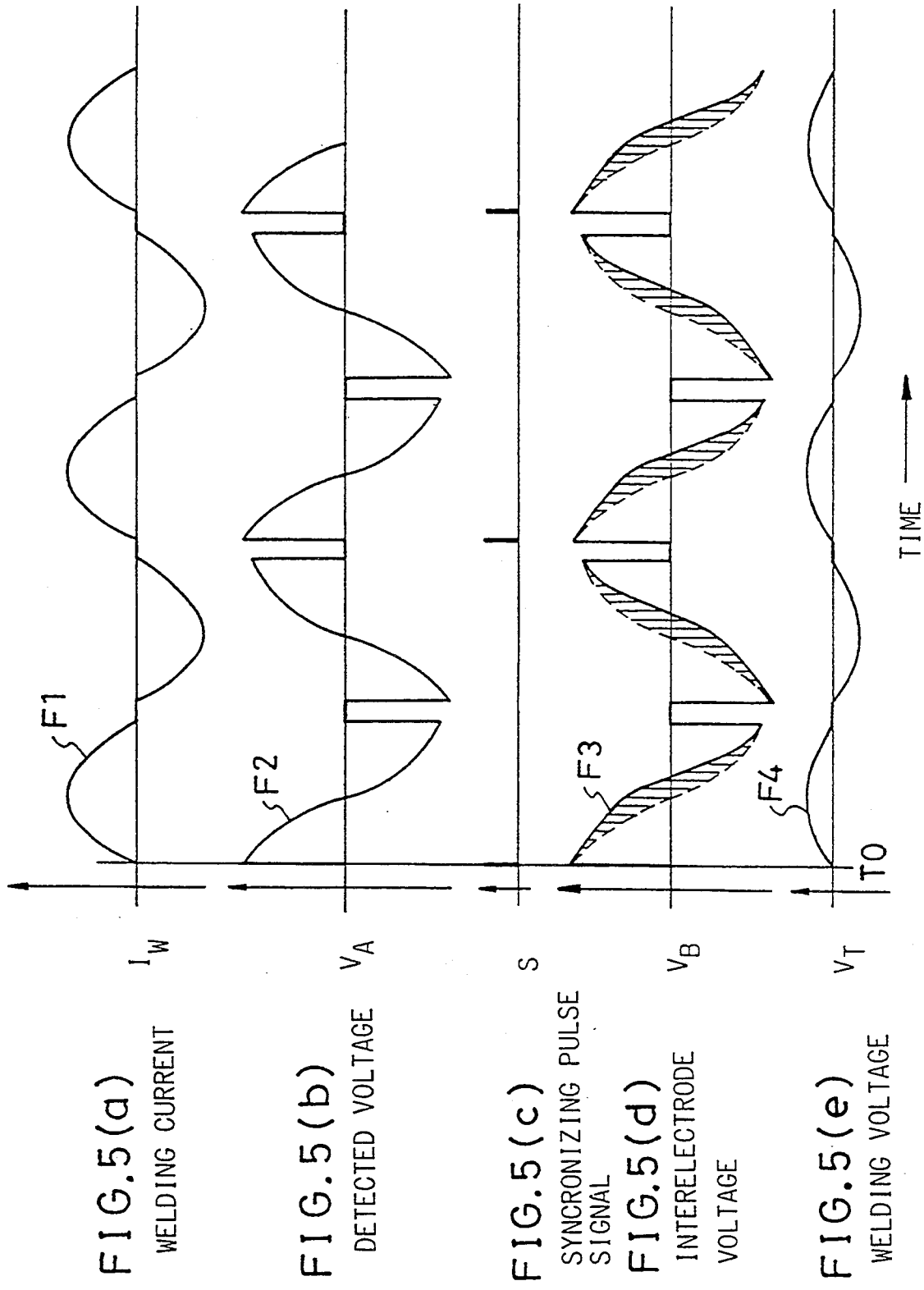
FIGS. 5(a), 5(b), 5(c), 5(d) and 5(e) are waveforms of signals in operation of the welding voltage detection device in the first example.

A waveform of the welding current $I_W$ is shown by a curve F1 in FIG. 5(a). Referring to FIG. 5(a), the waveform of the curve F1 is sharply distorted in proximity of the zero level of the sinusoidal wave. The distortion is caused by that the alternating current is interrupted during a period corresponding to a predetermined phase because the welding current is controlled by phase control of a thyristor. A waveform of a "detected voltage $V_A$" of the current sensor 5 is shown by a curve F2 in FIG. 5(b). Since the detected voltage $V_A$ of the current sensor 5 is in proportion to a variation of the magnetic field which is generated by the welding current $I_W$, the detected voltage $V_A$ is presented by a differentiated value of the welding current $I_W$ by a time t as shown by equation (1).

The detected voltage $V_A$ of the current sensor 5 is inputted to an amplifier 24 and is amplified thereby. The amplified detected voltage $V_A$ is applied to a synchronizing pulse generator 25, a sample-hold circuit 27 and a multiplier 29. The synchronizing pulse generator 25 comprises a differential circuit and a comparator, for example, and a synchronizing pulse signal S is output at the point of time of the rise edge of the detected voltage $V_A$ as shown in FIG. 5(c). The synchronizing pulse signal S is applied to the sample-hold circuits 26 and 27.

The electrodes 2 and 3 are connected to both input terminals of a differential amplifier 23 through respective electrical conductive wire 2A and 3A, and an "interelectrode voltage $V_B$" is detected. A waveform of the interelectrode voltage $V_B$ is shown by a curve F3 in FIG. 5(d). The interelectrode voltage $V_B$ is a sum voltage resulted by superimposings of the welding voltage $V_T$ and an induced voltage on the electrical conductive members 2A and 3A, which are connecting between the power source 1 and both the electrodes 2 and 3 and connecting between the electrodes 2 and 3 and the respective input terminals of the differential amplifier 23. Consequently, the interelectrode voltage $V_B$ is represented by an addition of the welding voltage $V_T$ and the differentiated value of the welding current $I_W$ by a time t as shown by equation (6):

$$K_B(dI_W/dt) + V_T = V_B \qquad (6)$$

The coefficient $K_B$ is a constant depending on a configuration of both the electrodes 2 and 3 and the electrical conductive members 2A and 3A. In an ordinary resistance spot welder, an induced voltage level is much larger than the level of the welding voltage $V_T$. Therefore, as shown by the curve F3 in FIG. 5(d), the waveform which is identical with the curve F2 of the detected voltage $V_A$ shown by a broken line is distorted by super-imposition of the welding voltage $V_T$ of the waveform shown by the curve F4 in FIG. 5(e). Hatched parts in FIG. 5(d) show variations by superimposition of the welding voltage $V_T$.

As shown in FIG. 4, the interelectrode voltage $V_B$ is applied to the sample-hold circuit 26 and the differential amplifier 30. In the sample-hold circuits 26 and 27, the detected voltage $V_A$ and the interelectrode voltage $V_B$ are sample-held in synchronism with the synchronizing pulse signal S inputted from the synchronizing pulse generator 25, respectively. The sample-held detected voltage $V_A$ and the interelectrode voltage $V_B$ are applied to a division circuit 28 where a calculation is made as shown by the relation (7):

$$V_B/V_A = K \qquad (7),$$

and a ratio signal $V_K$ representing a ratio K between the detected voltage $V_A$ and the interelectrode voltage $V_B$ is obtained thereby. The ratio signal $V_K$ is applied to one input terminal of the multiplier 29. The detected voltage $V_A$ from the amplifier 24 is applied to another input terminal of the multiplier 29, and a multiplied signal $V_{KA}$ representing multiplied value (K·$V_A$), of which the detected voltage $V_A$ is multiplied by the ratio K, is output therefrom. The multiplied value signal $V_{KA}$ is applied to one input terminal of the differential amplifier circuit 30.

Meaning of the multiplied value (K·$K_A$) is elucidated hereafter. Since the detected voltage $V_A$ and the interelectrode voltage $V_B$ are detected by separate sensing means, both the voltages $V_A$ and $V_B$ are inevitably different from each other. Therefore, in the above-mentioned operation, first, the ratio K of the detected voltage $V_A$ to the interelectrode voltage $V_B$ is derived at a point of time adjacent to a rise edge of the welding voltage $V_T$ at which a minimum welding voltage $V_T$ is superimposed on the interelectrode voltage $V_B$. Subsequently, the detected voltage $V_A$ is compensated by multiplying the detected voltage $V_A$ by the ratio K, and thus levels of both the detected voltage $V_A$ and the interelectrode voltage $V_B$ are each other normalized.

The interelectrode voltage $V_B$ is applied to another input terminal of the differential amplifier 30, and a difference voltage representing a difference between the detected voltage $V_A$ and the interelectrode voltage $V_B$ is output. The difference voltage represents the welding voltage T which is applied across both the electrodes 2 and 3 from the power source 1.

Referring to FIG. 5(c), though the period of the synchronizing pulse signal S is equal to the period of the welding current $I_W$, the period may be made to half of the period of the welding current $I_W$. In such case that the condition of the sensing means for sensing the detected voltage $V_A$ and the interelectrode voltage $V_B$ do not vary, the period of the synchronizing pulse signal S may be further prolonged. In this case, the ratio voltage $V_K$ output from the division circuit 28 is maintained to a constant value during the prolonged time.

EXAMPLE 2

FIG. 6 is a block diagram of another type of welding voltage detection apparatus for detecting the welding voltage $V_T$ in a resistance welder using a power source 1A of an inverter type. Referring to FIG. 6, in the power source 1A, an alternating current of a frequency which is several ten times of the frequency of the electric utility is generated, the generated alternating current is rectified, and a pulsating current (direct current including a ripple factor) is output. The welding voltage $V_T$ is applied across the electrodes 2 and 3 clamping the work 4, and the welding current $I_W$ flows through the work 4. A waveform of the welding current $I_W$ is shown by a curve F5 in FIG. 7(a). The welding current $I_W$ is detected by the current sensor 5 and is amplified by an amplifier 24 to output as a detected voltage $V_A$. A waveform of the detected voltage $V_A$ is shown by a curve F6 in FIG. 7(b). An interelectrode voltage $V_B$ across the electrodes 2 and 3 is detected by a differential amplifier 23. A waveform of the interelectrode voltage $V_B$ is shown by a curve F7 in FIG. 7(c). The interelectrode voltage $V_B$ is formed by superimposing an induced voltage which is identical with the detected voltage $V_A$ in waveform, on the welding voltage $V_T$ shown by a curve F8 in FIG. 7(d).

The detected voltage $V_A$ and the interelectrode voltage $V_B$ are applied to a multiplexer 31 and are switched by a predetermined switching signal which is applied from a CPU 33A to input to an analog-to-digital convertor 32. In the analog-to-digital convertor 32, the detected voltage $V_A$ and the interelectrode voltage $V_B$ are converted into respective digital signal in-turn, and is applied to the CPU 33A of a calculating circuit 33.

The calculation circuit 33 comprises the CPU 33A, a memory 33B and an input-output circuit 33C. The calculation operation in the calculation circuit 33 is elucidated hereafter.

Figure 7:
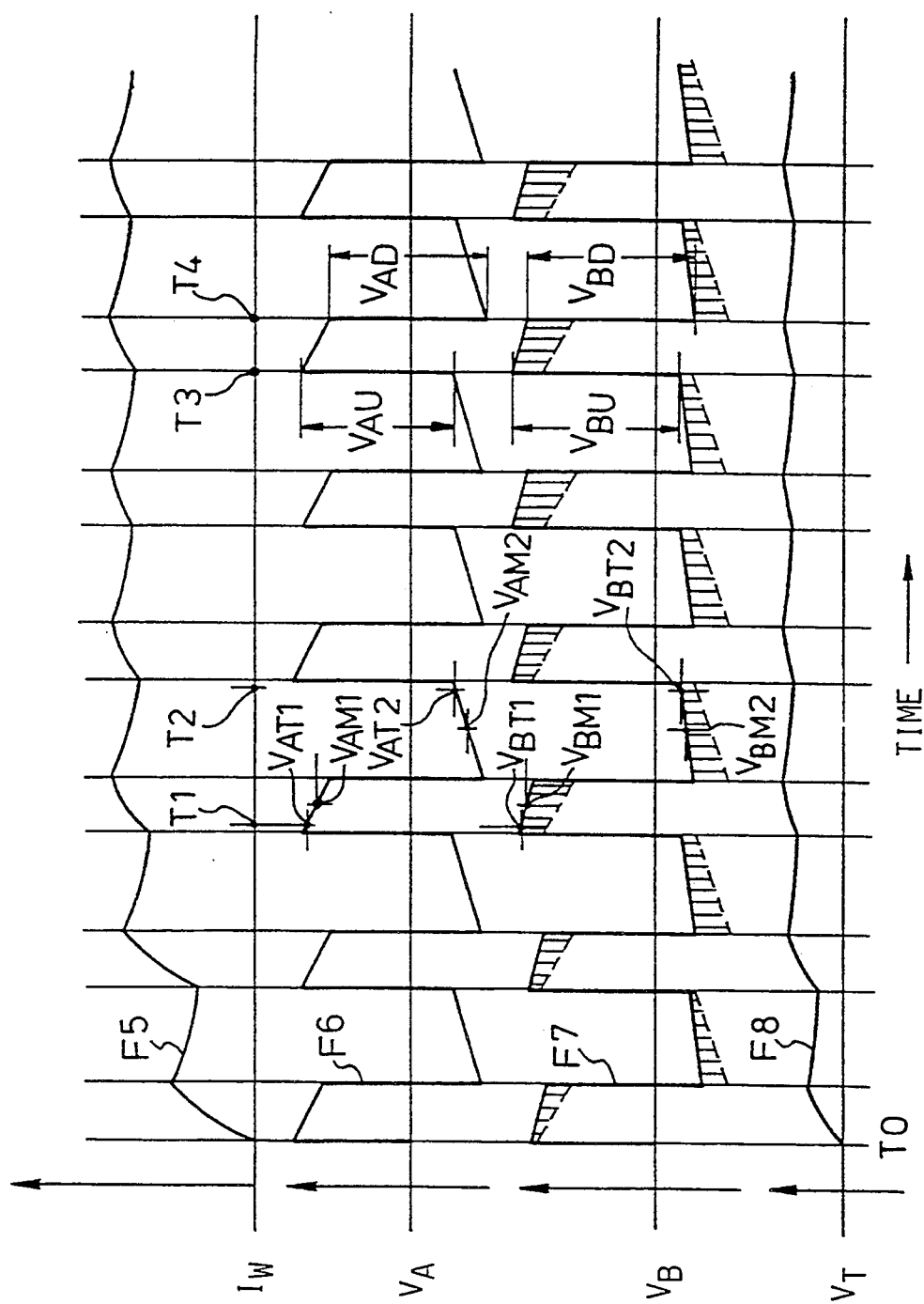
FIGS. 7(a), 7(b), 7(c) and 7(d) are waveforms of signals in operation of the welding voltage detection device in the second example.
Figure 8:
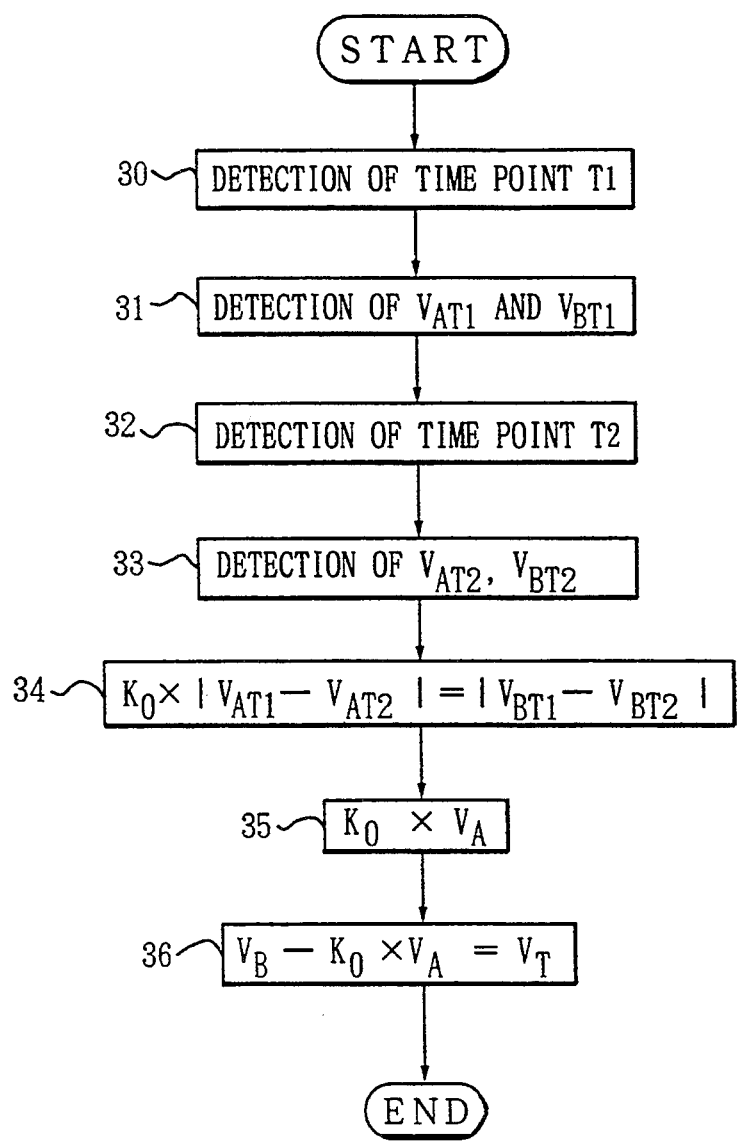
FIG. 8 is a flow chart of operation of the welding voltage detection device in the second example.

In the CPU 33A, first, a point of time T1 at which the polarity of the detected voltage $V_A$ or the interelectrode voltage $V_B$ changes from a negative value to a positive value is detected, on the waveforms of the detected voltage $V_A$ and the interelectrode voltage $V_B$ shown by curves F6 and F7 in FIGS. 7(b) and 7(c), respectively (Step 30 in FIG. 8). Subsequently, a voltage $V_{AT1}$ of the detected voltage $V_A$ and a voltage $V_{BT1}$ of the interelectrode voltage $V_B$ are detected at immediately after the time point T1 (Step 31). Furthermore, another point of time T2 at which the polarity changes after one period from the time point T1 of the detected voltage $V_A$ (or the interelectrode voltage $V_B$) is detected (Step 32). And a voltage $V_{AT2}$ of the detected voltage $V_A$ and a voltage $V_{BT2}$ of the interelectrode voltage $V_B$ are detected at immediately before the time point T2 (Step 33). These voltage $V_{AT1}$ and voltage $V_{BT1}$ may be replaced with central voltages $V_{AM1}$ and $V_{BM1}$ in the positive periods of the detected voltage $V_A$ and the interelectrode voltage $V_B$, respectively. In a similar manner, the voltages $V_{AT2}$ and $V_{BT2}$ may be replaced with central voltages $V_{AM2}$ and $V_{BM2}$ in negative value periods of the detected voltage $V_A$ and the interelectrode voltage $V_B$, respectively.

Subsequently, a calculation given by equation (8) is performed in the calculation circuit 33 (Step 34), $$|V_{BT1} - V_{BT2}| = K_0 |V_{AT1} - V_{AT2}| \qquad (8).$$

The coefficient $K_0$ represents a ratio of a shifted value in polarity of the detected voltage $V_A$ to a shifted value in polarity of the interelectrode voltage $V_B$. The detected voltage $V_A$ is multiplied by the coefficient $K_0$. Consequently, a detected voltage $K_0 \cdot V_A$ which is equal to the interelectrode voltage $V_B$ in the polarity-shifted value is derived (Step 35). Subsequently, the welding voltage $V_T$ is detected by applying subtraction operation between the detected voltage $K_0 \cdot V_A$ and the interelectrode voltage $V_B$ (Step 36).

The coefficient $K_0$ can be derived by another method. For example, a point of time T3 at which the polarity of the detected voltage $V_A$ (or the interelectrode voltage $V_B$) changes from the negative value to the positive value is detected, and a rise up potential $V_{AU}$ of the detected voltage and a rise up potential $V_{BU}$ of the interelectrode voltage $V_B$ are detected at the time point T3. Subsequently, the coefficient $K_0$ is derived by a ratio between both the rise up potentials $V_{AU}$ and $V_{BU}$ ($V_{BU}/V_{AU}=K_0$).

Furthermore, a point of time T4 at which the polarity of the detected voltage $V_A$ (or interelectrode voltage $V_B$) changes from a positive value to a negative value is detected, and a fall down potential $V_{AD}$ of the detected voltage $V_A$ and a fall down potential $V_{BD}$ of the interelectrode voltage $V_B$ is detected. Subsequently, the coefficient $K_0$ is derived by a ratio between both the fall down potentials $V_{AD}$ and $V_{BD}$ ($V_{BD}/V_{AD}=K_0$).

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A resistance welding monitor comprising:
   input means for inputting data representing material characteristics of a material of a work to be welded, data representing a thickness of said work and data representing the shape of a pair of electrodes of a resistance welder,
   a current sensor for detecting a welding current in welding operation,
   welding voltage detection means for detecting a welding voltage which is a true output voltage of a power source of said resistance welder, on the basis of said welding current and said interelectrode voltage, detected by interelectrode voltage measuring means for measuring an interelectrode voltage received through a pair of coupling wire from said pair of electrodes,
   calculation means for deriving a contact diameter which is a diameter of a current-pass between said electrode and work and an interplate current-pass diameter which is a diameter of a contact part of plural plates of said work, on the basis of an electrode resistance of the resistance of said electrode, a contact resistance of a resistance between said electrode and the surface of the work and a work resistance which is a ratio between said welding voltage and said welding current,
   means for deriving a temperature distribution in said work on the basis of said welding voltage, welding current, contact diameter and interplate current pass diameter,
   nugget diameter calculation means for deriving a nugget diameter which is formed between said plural plates on the basis of said temperature distribution,
   input means for inputting data of a reference nugget diameter of a target diameter, and
   comparison means for comparing said nugget diameter with said reference nugget diameter and for outputting a comparison result.

2. A resistance welding monitor in accordance with claim 1, wherein
   said comparison means comprises means for outputting a control signal corresponding to said comparison result.

3. A resistance welding monitor in accordance with claim 2, wherein
   said means for outputting said control signal comprises control means for changing responding to a control signal output from said comparison means at least one of a welding pressure of said electrodes, said welding current and a time length for flowing said welding current, thereby determining a welding condition in resistance welding.

4. A resistance welding monitor in accordance with claim 1, wherein
   said calculation means comprises means for deriving nugget diameters at every successive welding operation, and for calculating an average of plural nugget diameters derived by said successive welding operations.

5. A resistance welding monitor in accordance with claim 1, wherein
   said calculation means comprises means for deriving nugget diameters at every successive welding operation, for deriving a regression line on the basis of a variation of said nugget diameters of said successive welding operations, and for deriving a nugget diameter on the basis of said regression line.

6. A resistance welding monitor in accordance with claim 1, wherein
   said calculation means comprises means for deriving nugget diameters every successive welding operation, for dividing said derived plural nugget diameters in plural groups in the order of a time sequence, for deriving an average in each group, for deriving a regression line of said average on the basis of the variation of said average, and for deriving a nugget diameter on the basis of said regression line.

7. A welding voltage measuring apparatus of a resistance welder comprising:
   a current sensor for detecting a welding current and for outputting a detected voltage,
   interelectrode voltage detection means for detecting an interelectrode voltage across a pair of electrodes of said resistance welder,
   first calculation means for deriving a ratio of said detected voltage to said interelectrode voltage at a point of time of the rise edge of said welding current,
   second calculation means for multiplying one of said detected voltage and said interelectrode voltage by said ratio derived by said first calculation means, and for equalizing both values of said detected voltage and said interelectrode voltage at said point of time of the rise edge, and third calculation means for deriving a voltage difference between said equalized detected voltage and interelectrode voltage.

8. A welding voltage measuring apparatus of a direct current resistance welder comprising:
- a current sensor for detecting a welding current and for outputting a detected voltage,
- interelectrode voltage detection means for detecting an interelectrode voltage across a pair of electrodes of said resistance welder,
- first voltage detection means for detecting a first detected voltage and a first interelectrode voltage at a first time immediately after said welding current has changed from decreasing phase to increasing phase,
- a second voltage detection means for detecting a second detected voltage and a second interelectrode voltage at a second time point immediately before said welding current will change from decreasing phase to increasing phase,
- first calculation means for deriving a first absolute value of a difference between said first detected voltage and said second detected voltage, and a second absolute voltage of a difference between said first interelectrode voltage and said second interelectrode voltage, and deriving a ratio of said first absolute value to said second absolute value,
- second calculation means for equalizing both the values of said detected voltage and said interelectrode at one of said first time and said second time by multiplying one of said detected voltage and said interelectrode voltage by said ratio, and
- third calculation means for deriving a voltage difference between said equalized detected voltage and said interelectrode voltage.

9. A welding voltage measuring apparatus of a direct current resistance welder in accordance with claim 8, wherein
- said voltage detection means detects a first detected voltage and a first interelectrode voltage at a first point of time in increasing phase of said welding current and a second detected voltage and a second interelectrode voltage at a second point of time in decreasing phase of said welding current,
- first calculation means derives a first absolute value of a difference of said first detected voltage and a second detected voltage and a second absolute voltage of a difference between said first interelectrode voltage and said second interelectrode voltage, and derives a ratio of said first absolute value and second absolute value,
- second calculation means equalizes both the values of said detected voltage and said interelectrode voltage at one of said first time point and said second point of time by multiplying one of said detected voltage and said interelectrode voltage by said ratio, and
- third calculation means derives a voltage difference between said equalized detected voltage and interelectrode voltage.

10. A welding voltage measuring apparatus of a direct current resistance welder in accordance with claim 8, wherein
- said voltage detection means detects a variation of said detected voltage and a variation of said interelectrode voltage at a point of time at which said welding current changes from decreasing phase to increasing phase,
- first calculation means derives a ratio of a variation of said detected voltage to a variation of said interelectrode voltage,
- second calculation means equalizes both the values of said detected voltage and said interelectrode voltage at said time point by multiplying one of said detected voltage and said interelectrode voltage by said ratio, and
- third calculation means derives a voltage difference between said equalized detected voltage and interelectrode voltage.

11. A welding voltage measuring apparatus of a direct current resistance welder in accordance with claim 8, wherein
- said voltage detection means detects a variation between said detected voltage and a variation of said interelectrode voltage at a point of time at which said welding current changes from increasing phase to decreasing phase,
- first calculation means derives a ratio of a variation of said detected voltage to a variation of said interelectrode voltage,
- second calculation means equalizes both the values of said detected voltage and said interelectrode voltage at said time point by multiplying one of said detected voltage and said interelectrode voltage by said ratio, and
- third calculation means derives a voltage difference between said equalized detected voltage and interelectrode voltage.

* * * * *